United States Patent

Bittner

(10) Patent No.: US 6,736,538 B2
(45) Date of Patent: May 18, 2004

(54) MIXING BLADE FOR DRINK PREPARATION

(75) Inventor: John Bittner, Johnston, MI (US)

(73) Assignee: Dunkin' Donuts Incorporated, Randolph, MA (US)

( * ) Notice: Subject to any disclaimer, the term of this patent is extended or adjusted under 35 U.S.C. 154(b) by 0 days.

(21) Appl. No.: 10/148,349

(22) PCT Filed: Dec. 14, 2000

(86) PCT No.: PCT/US00/42825

§ 371 (c)(1),
(2), (4) Date: Nov. 6, 2002

(87) PCT Pub. No.: WO01/43560

PCT Pub. Date: Jun. 21, 2001

(65) Prior Publication Data

US 2003/0133359 A1 Jul. 17, 2003

Related U.S. Application Data

(60) Provisional application No. 60/170,800, filed on Dec. 15, 1999.

(51) Int. Cl.[7] ............... B01F 7/16; B01F 7/32
(52) U.S. Cl. ............ 366/199; 366/265; 366/343; 366/348
(58) Field of Search ................... 366/265, 199, 366/200, 328.2, 328.3, 342, 343, 129, 197, 348

(56) References Cited

U.S. PATENT DOCUMENTS

| | | | | | |
|---|---|---|---|---|---|
| 2,546,285 | A | * | 3/1951 | Wittmann | 366/276 |
| 2,635,860 | A | * | 4/1953 | McLeod | 366/265 |
| 3,252,690 | A | * | 5/1966 | Martin | 366/265 |
| 4,408,690 | A | * | 10/1983 | Ferrero | 366/155.1 |
| D365,246 | S | * | 12/1995 | Staffin et al. | D7/376 |
| 6,200,015 | B1 | * | 3/2001 | Gartz et al. | 366/256 |

* cited by examiner

Primary Examiner—Tony G. Soohoo
(74) Attorney, Agent, or Firm—Mintz, Levin, Cohn, Ferris, Glovsky and Popeo, P.C.

(57) ABSTRACT

A mixing blade (10) for mixing a drink in a cup (20) having a dome-shaped lid (30) with an opening (32) therein is provided. The mixing blade comprises tow hollow truncated cones (12, 14) attached base-to-base. A top side of one cone has an opening (18) therein for attaching to a rotatable shaft(2). The cone-shaped walls each have a plurality of openings (16) therein. To mix a drink, the ingredients are measured and placed in the cup and the lid is placed on the cup. The mixing blade is inserted through the opening in the lid and is spun or rotated for a predetermined mixing time. After the blade is removed from the drink, the drink is served and the blade is sanitized in a sanitizing solution before being used to mix another drink. The mixing blade is particularly suitable for the preparation of frozen drinks.

19 Claims, 5 Drawing Sheets

MIXING BLADE FOR DRINK PREPARATION

CROSS REFERENCE TO RELATED APPLICATIONS

This application claims the benefit under 35 U.S.C. § 119(e) of U.S. Provisional Application No. 60/170,800, filed on Dec. 15, 1999, the disclosure of which is incorporated by reference herein.

STATEMENT REGARDING FEDERALLY SPONSORED RESEARCH OR DEVELOPMENT

N/A

BACKGROUND OF THE INVENTION

Fast food establishments often offer frozen drinks that are prepared for the customer at the point of sale. Examples of a frozen drink include the Coffee and Fruit Coolatta® drinks offered by Dunkin' Donuts. Drink preparation typically comprises measuring two or more ingredients, such as diary, flavoring syrup, frozen base, etc., in a measuring cup, which may subsequently serve as the serving cup. The ingredients are poured from the measuring cup into a stainless steel mixing cup or malt cup. The ingredients are mixed for a predetermined mixing time using a mixing apparatus having a mixing blade. The mixing blade is sanitized for a predetermined sanitizing time in a sanitizing solution. The mixed ingredients are poured into a disposable serving cup and a lid is placed onto the disposable serving cup. The frozen drink is served along with a straw to the customer. The disposable serving cup may serve as the measuring cup, and the preparation may comprise one or more additional steps, such as the addition of one or more toppings, e.g., whipped cream and cinnamon powder. Frozen drink preparation is time consuming and slows the servicing of fast food customers who desire and expect quick service.

Some prior art mixing blades are illustrated in FIGS. 13–18. These blades are commercially available, but are not used for and are not suitable for mixing frozen drinks.

SUMMARY OF THE INVENTION

The present invention provides a mixing blade and a method for preparing a drink, particularly a frozen drink, using the mixing blade, in which the ingredients are measured directly into a disposable serving cup and mixed therein with the mixing blade. The mixing blade is affixed to a rotatable shaft of a mixing apparatus and is sized to pass through an opening in a domed lid placed on the serving cup containing the ingredients to be mixed. The domed lid keeps the ingredients from splattering outside of the cup during mixing.

In one embodiment, the mixing blade has a hollow shape generally comprising a top cone frustum portion oriented base-to-base with a bottom cone frustum portion. Openings, such as generally triangular openings, are disposed on the sides of the top and bottom portions. The top side of the mixing blade has an opening sized for receiving a bolt used to affix the mixing blade to the rotating shaft, and the bottom side of the mixing blade is open.

The mixing blade facilitates an improved method for preparing a drink, particularly a frozen drink, wherein the measured ingredients remain in the disposable cup for the mixing step to thereby reduce the number of steps required to prepare the frozen drink. In contrast to the larger, metal prior art mixing blades, the mixing blade of the present invention is smaller and preferably formed of a plastic material, so that it does not cut the plastic disposable serving cup during mixing.

DESCRIPTION OF THE DRAWINGS

The invention will be more fully understood by reference to the following detailed description of the invention in conjunction with the drawings, of which.

DETAILED DESCRIPTION OF THE INVENTION

Figure 1:
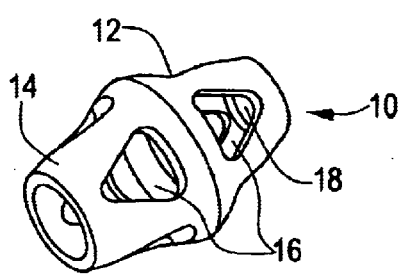
FIG. 1 is perspective view of a mixing blade in accordance with the invention.
Figure 2B:
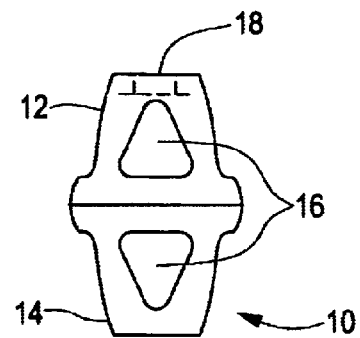
FIG. 2B is a first side view of the mixing blade of FIG. 1.
Figure 2A:
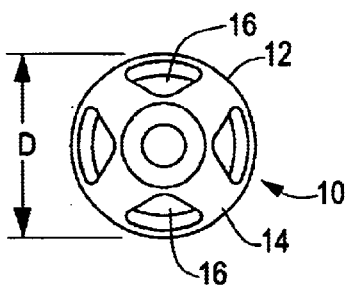
FIG. 2A is a top view of the mixing blade of FIG. 1.
Figure 2C:
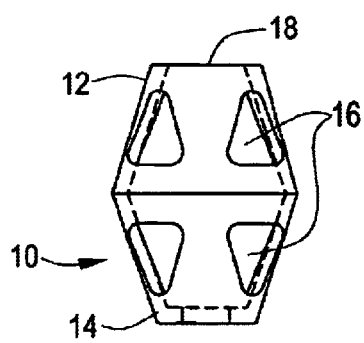
FIG. 2C is a second side view of the mixing blade of FIG. 1.
Figure 3A:
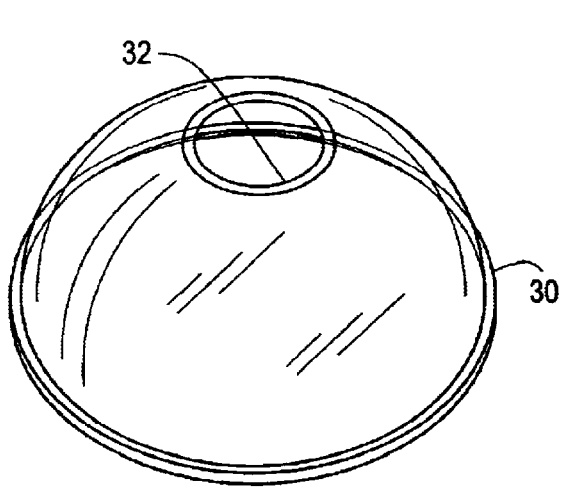
FIG. 3A is an illustration of a domed lid having an opening for the passage of the mixing blade of FIG. 1.
Figure 12:
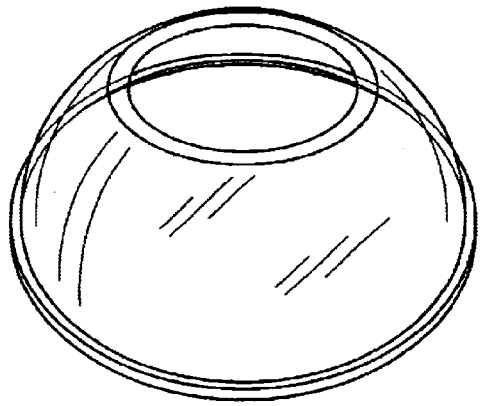
FIG. 12 is a domed lid having a wide-diameter opening.
Figure 13:
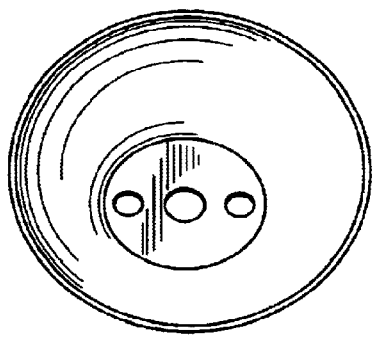
FIGS. 13–18 are illustrations of prior art large-diameter metal mixing blades.
Figure 14:
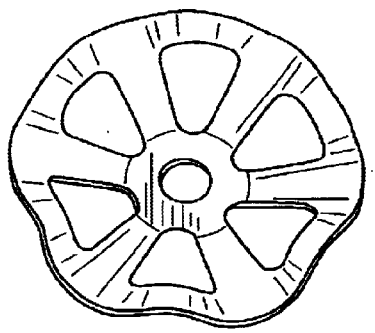
Figure 15:
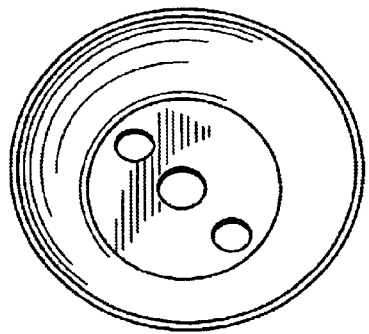
Figure 16:
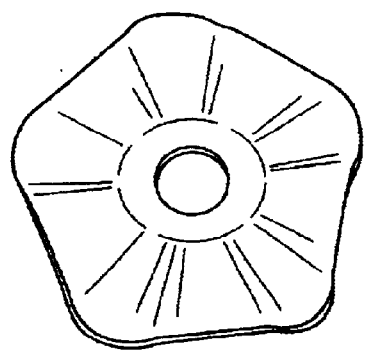
Figure 17:
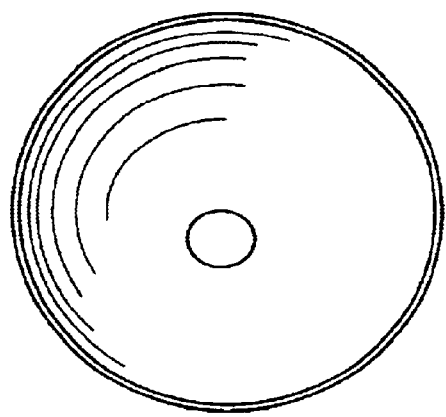
Figure 18:
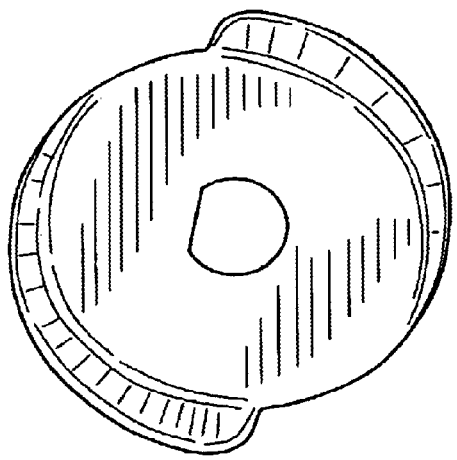

A perspective view of a mixing blade 10 in accordance with the invention is illustrated in FIG. 1. The mixing blade is made from a suitable material, preferably a plastic such as DELRIN®, although a metal such as stainless steel may be used also. A top view and first and second side views of the mixing blade 10 are illustrated in FIGS. 2A–C. The mixing blade 10 has a hollow shape generally consisting of a truncated top cone 12 oriented base-to-base with a truncated bottom cone 14. The truncated cones are preferably cone frustum portions having parallel top and bottom sides. The mixing blade 10 has a maximum diameter, D, that is sized to permit passage of the mixing blade 10 through an opening 32 in a domed lid 30 that is illustrated in FIG. 3A. The opening 32 may have a diameter of 1 inch, so D is smaller than 1 inch for use with this lid. The frozen drink may alternatively be prepared using a domed lid 130 having a wide-diameter opening 132, as illustrated in FIG. 12.

Four equally spaced and generally triangular openings 16 are disposed on the sides of both the top and bottom frustum portions 12, 14. The triangle bases are oriented toward the bases of the frustum portions 12, 14 so that the triangle tops point toward the ends of the mixing blade 10. The top side of the mixing blade 10 has an opening 18 sized for receiving a bolt 40 used to affix the mixing blade to the rotatable shaft 42, and the bottom side of the mixing blade 10 is open. It will be appreciated that the mixing blade may be affixed to the rotatable shaft in any other suitable manner.

Figure 3B:
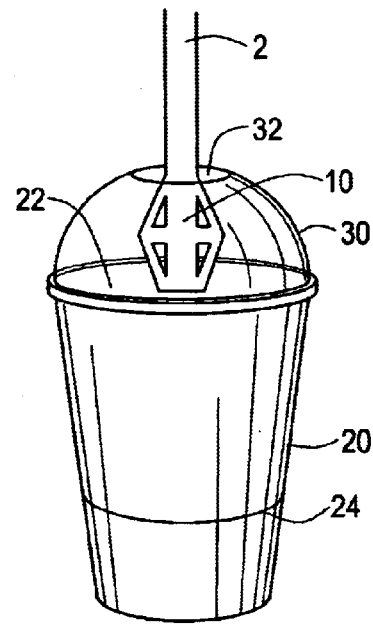
FIG. 3B is an illustration of the mixing blade of FIG. 1 positioned under the domed lid of a disposable serving cup containing ingredients to be mixed.

The mixing blade 10 is shown positioned under the domed lid 30 of a disposable serving cup 20 containing ingredients 22 to be mixed in FIG. 3B. The disposable serving cup 20 may include one or more markings 24 or surface features used during measuring to indicate the specified amount of a particular ingredient. The disposable serving cup 20 is initially placed under the mixing blade 10, which is affixed to the rotatable shaft 42 attached to a motorized mixing apparatus (not shown). The domed lid 30 has an opening 32 and the maximum diameter, D, of the mixing blade 10 is sized so that the domed lid 30 can pass over the mixing blade 10 as the disposable serving cup 20 is raised. The disposable serving cup 20 is raised until the mixing blade 10 is positioned preferably at the bottom of the cup 20 to thereby ensure that the ingredients are properly mixed. Alternatively, the mixing blade may be lowered through the domed lid into the cup.

Figure 4:
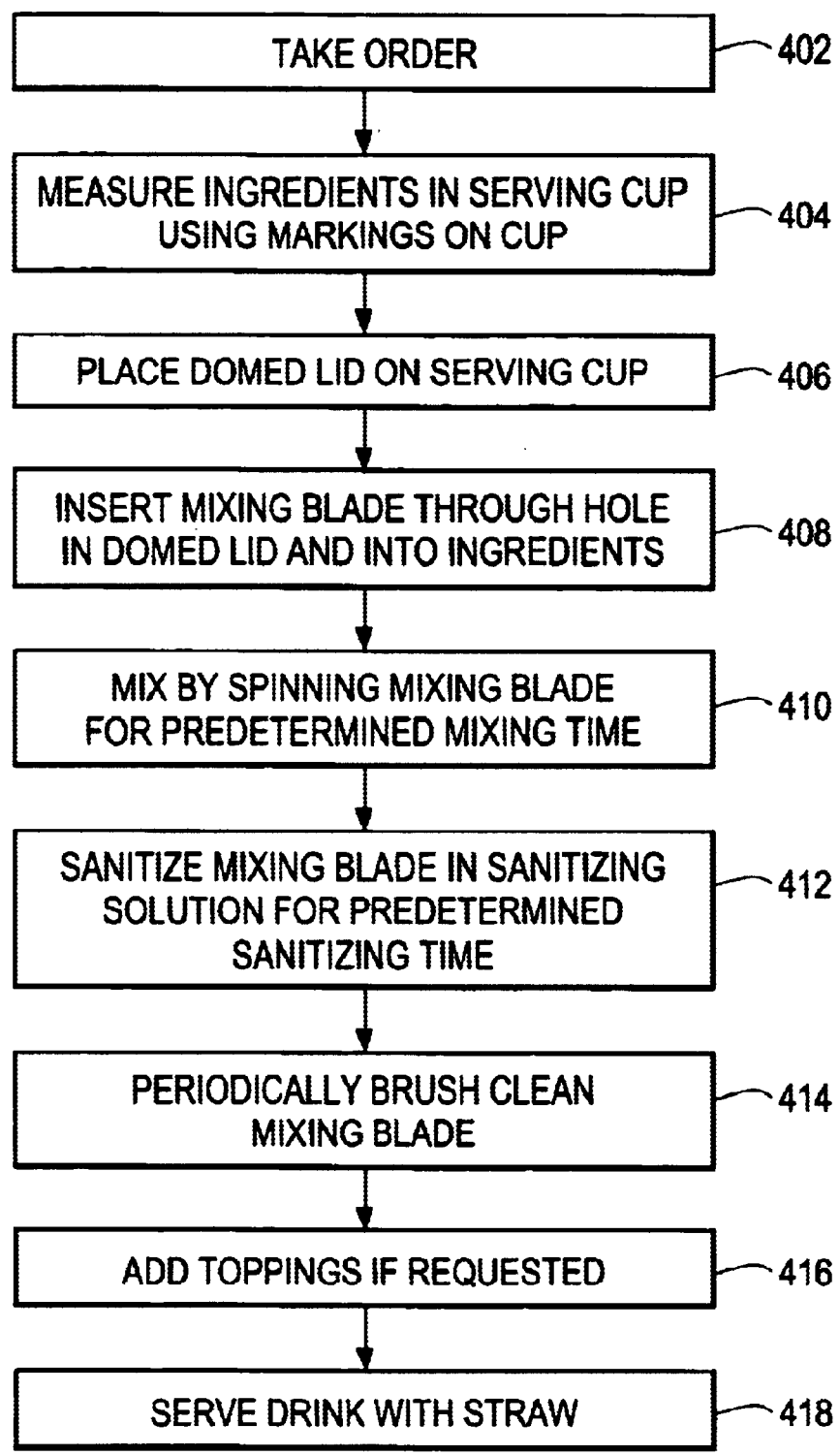
FIG. 4 is flow diagram of a frozen drink preparation procedure utilizing the mixing blade of FIG. 1.

A flow diagram of a method for preparing a frozen drink using the above-described mixing blade 10 is shown in FIG. 4. The frozen drink order is taken at step 402. The ingredients are measured, preferably by accumulating the ingredients 22 in the disposable serving cup 20, in step 404. When all the ingredients 22 have been measured and are in the cup 20, a domed lid 30 is placed onto the cup 20 at step 406.

The cup 20 is placed onto the rotatable shaft 42 as described above at step 408. The ingredients are mixed by rotating or spinning the mixing blade 10 for a predetermined time, typically 3 to 5 seconds, at step 410. The domed lid keeps the ingredients from splattering outside of the cup. After mixing is performed and the cup 20 is removed from the shaft 40, the mixing blade 10 and shaft 40 are sanitized at step 412. A sanitizing cup (not shown) containing a sanitizing solution is placed onto the shaft and the mixing blade is rotated for a predetermined sanitizing time, preferably 1 second. As indicated at step 414, the mixing blade 10 is brushed clean periodically, preferably every 4 hours and using a wire-type brush (not shown) to facilitate the cleaning of the triangular openings 16.

Any requested toppings are added to the mixed drink at step 416. Preferably, the toppings are added without removal of the lid 30. Lastly, the disposable serving cup containing the prepared frozen drink is served to the customer, usually along with a straw, at step 418.

Figure 5:
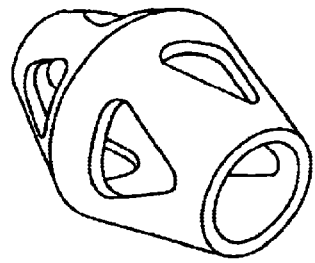
FIGS. 5–11 are illustrations of a variety of alternative embodiments of the mixing blade of FIG. 1.
Figure 9:
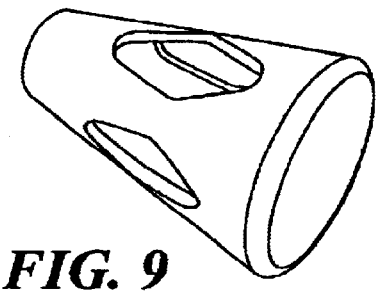
Figure 6:
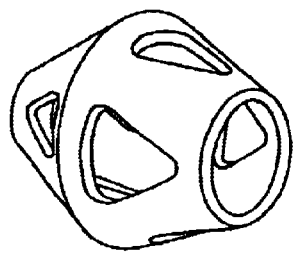
Figure 10:
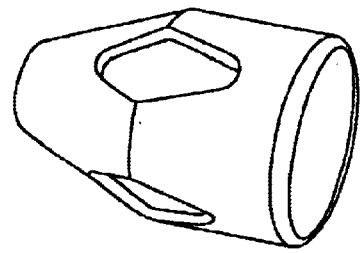
Figure 7:
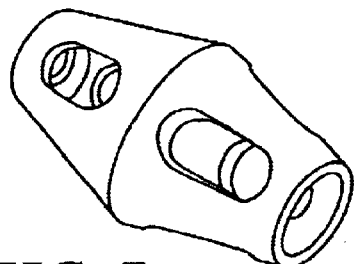
Figure 11:
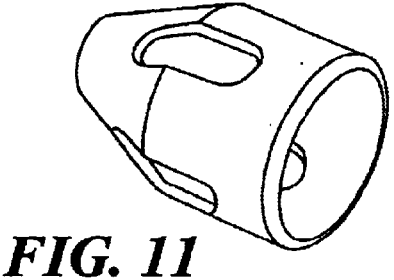
Figure 8:
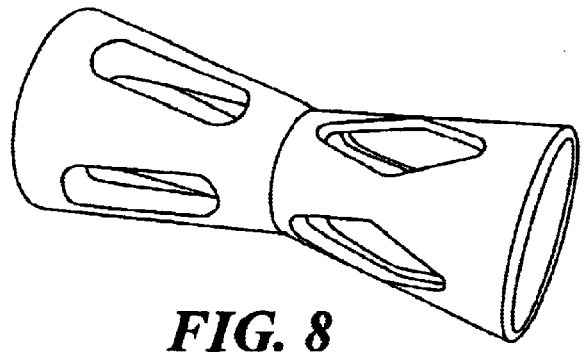

Illustrations of a variety of alternative embodiments of the mixing blade 10 are illustrated in FIGS. 5–11. For example, size and angles of the truncated cones may be varied, as illustrated in FIGS. 5–7. The openings in the cone-shaped walls may be triangular, oval (FIGS. 7, 8, and 11), diamond-shaped (FIGS. 8–10), or any other desired shape. The cones may be oriented with their more narrow top sides abutting, as in FIG. 8. Only one truncated cone may be provided, as in FIG. 9. A single truncated cone having two wall portions with different conic angles may be used. A single truncated cone and an abutting cylinder may be provided, as in FIGS. 10 and 11.

Having described a preferred embodiment of the invention it will now become apparent to those of ordinary skill in the art that other embodiments incorporating the concepts of the present invention could also be utilized. Accordingly, it is submitted that the invention should not be limited to the described embodiment but rather should be limited only by the scope and spirit of the appended claims.

What is claimed is:

1. A mixing blade for mixing a drink in a cup having a dome-shaped lid with an opening therein, the mixing blade comprising:
    a hollow truncated cone comprising a cone-shaped wall, a top side and a bottom side, the top side having an opening therein, the bottom side having an opening therein, and the cone-shaped wall having a plurality of openings therein, the cone having a diameter sized to allow passage of the cone through the opening in the dome-shaped lid, wherein the openings in the cone-shaped wall are triangular, oval, or diamond-shaped.

2. The mixing blade of claim 1, wherein the hollow truncated cone comprises a first hollow truncated cone; and further comprising a second hollow truncated cone comprising a cone-shaped wall, a top side and a bottom side, the top side having an opening therein, the bottom side having an opening therein, and the cone-shaped wall having a plurality of openings therein, the second hollow truncated cone oriented in abutting relationship with the first hollow truncated cone.

3. The mixing blade of claim 2, wherein the first hollow truncated cone and the second hollow truncated cone are oriented with respective bottom sides abutting.

4. The mixing blade of claim 2, wherein the first hollow truncated cone and the second hollow truncated cone are oriented with respective top sides abutting.

5. The mixing blade of claim 1, wherein the openings in the cone-shaped wall are equally spaced around the cone-shaped wall.

6. The mixing blade of claim 1, wherein the plurality of openings in the cone-shaped wall comprises four openings.

7. The mixing blade of claim 1, wherein the openings in the cone-shaped wall are triangular with bases oriented toward the bottom side of the hollow truncated cone.

8. The mixing blade of claim 1, wherein the opening in the top side is sized to receive a rotatable shaft.

9. The mixing blade of claim 8, wherein the hollow truncated cone is affixed to the rotatable shaft by a bolt.

10. The mixing blade of claim 1, wherein the hollow truncated cone comprises a cone frustum portion.

11. The mixing blade of claim 1, wherein the hollow truncated cone comprises a first cone-shaped wall having a first conic angle and a second cone-shaped wall having a second conic angle greater than the first conic angle.

12. A mixing blade for mixing a drink in a cup having a dome-shaped lid with an opening therein, the mixing blade comprising:
    a hollow truncated cone comprising a cone-shaped wall, a top side and a bottom side, the to side having an opening therein, the bottom side having an opening therein, and the cone-shaped wall having a plurality of openings therein, the cone having a diameter sized to allow passage of the cone through the opening in the dome-shaped lid; and
    a cylindrical portion abutting the bottom side of the hollow truncated cone.

13. A method for mixing a drink using the mixing blade of claim 1, comprising:
    providing the mixing blade of claim 1, a cup, and a dome-shaped lid with an opening therein sized to allow passage of the mixing blade therethrough, the lid adapted to fasten to the top of the cup;
    measuring ingredients into the cup;
    placing the lid on the cup;
    inserting the mixing blade through the opening in the lid and into the cup;
    rotating the mixing blade to mix the ingredients for a predetermined mixing time; and
    removing the mixing blade.

14. The method of claim 13, further comprising sanitizing the mixing blade by placing the mixing blade in a sanitizing solution for a predetermined sanitizing time.

15. The method of claim 13, further comprising cleaning the mixing blade with a brush.

16. The method of claim 13, further comprising serving the drink in the cup.

17. A drink preparation assembly comprising:
    the mixing blade of claim 1;
    a disposable mixing and serving cup; and
    a domed lid adapted to fasten to the disposable mixing and serving cup, the domed lid having an opening therein for passage of the mixing blade therethrough.

18. The drink preparation assembly of claim 17, wherein the disposable mixing and serving cup includes ingredient measuring indicia thereon.

19. The drink preparation assembly of claim 17, wherein the disposable mixing and serving cup comprises a plastic cup.

* * * * *